United States Patent

Otani et al.

[11] Patent Number: 5,200,075
[45] Date of Patent: Apr. 6, 1993

[54] SEPARATOR

[75] Inventors: Seiya Otani, Tokyo; Hiroaki Taniguchi, Kuki; Kei Yokoyama, Fukuyama; Yoshimi Shiroto, Yokohama; Mitsunori Shimura, Yokohama; Osamu Akimoto, Yokohama; Masayoshi Notoya, Kawasaki, all of Japan

[73] Assignees: NKK Corporation; Chiyoda Corporation, both of Japan

[21] Appl. No.: 846,198

[22] Filed: Mar. 5, 1992

[30] Foreign Application Priority Data

Mar. 8, 1991 [JP] Japan .................... 3-069069
Mar. 8, 1991 [JP] Japan .................... 3-069070

[51] Int. Cl.⁵ .................... B01D 24/04; B01D 24/12; B01D 24/42
[52] U.S. Cl. .................... 210/283; 210/291; 210/198.2
[58] Field of Search ........ 210/283, 198.2, 284, 210/291

[56] References Cited

U.S. PATENT DOCUMENTS

| | | | |
|---|---|---|---|
| 3,136,719 | 6/1964 | Serra | 210/284 |
| 3,789,989 | 2/1974 | Carson | 210/291 |
| 4,461,649 | 7/1984 | Neuzil et al. | 210/674 |
| 4,970,002 | 11/1990 | Ando et al. | 210/198.2 |
| 4,990,259 | 2/1991 | Kearney et al. | 210/198.2 |
| 5,122,275 | 6/1992 | Rasche | 210/198.2 |

FOREIGN PATENT DOCUMENTS 061267 12/1979 Japan .

*Primary Examiner*—Stanley S. Silverman
*Assistant Examiner*—Cynthia L. Nessler
*Attorney, Agent, or Firm*—Lorusso & Loud

[57] ABSTRACT

An adsorbent is charged into a horizontal type packed column having a multiplicity of packed vessels each of which is composed of a partition plate and a cylindrical body and which are connected through the partition plates, from an opening formed on the upper wall of each cylindrical body. Then, each opening is closed tightly with a detachable plug cover. The partition plate is provided with a first fluid passage through which a fluid is passed in the direction of the axis of the cylindrical body and a second fluid passage which is in communication with the first fluid passage, which extends toward the peripheral wall of the cylindrical body and which opens at the cylindrical body. This apparatus is suitable for use as a multiple-stage adsorption separator directed to a simulated moving-bed system.

10 Claims, 8 Drawing Sheets

F I G. 4
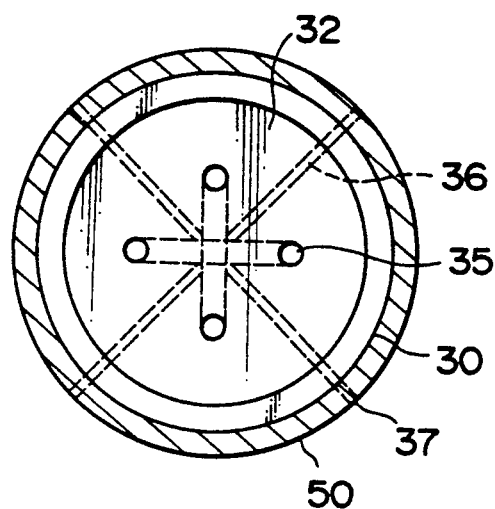
F I G. 5
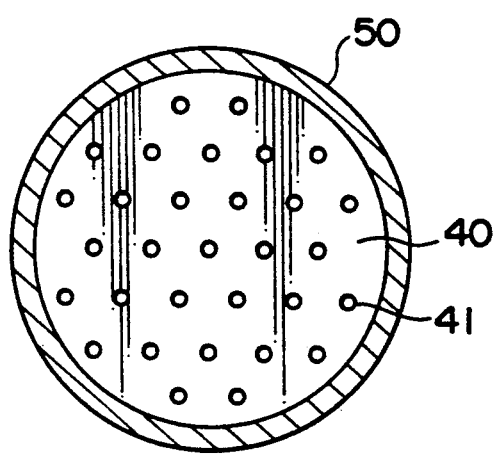

FIG. 6
FIG. 7
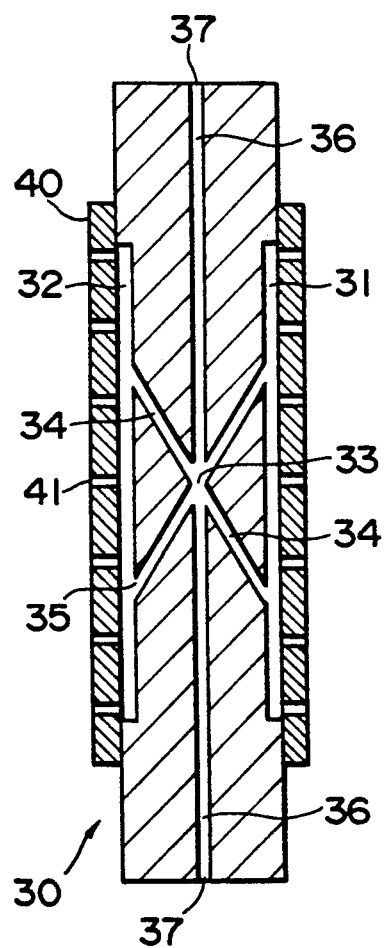
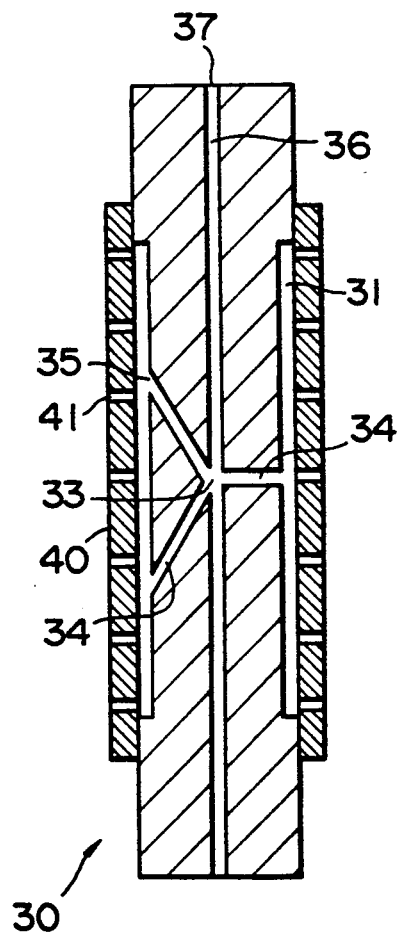

FIG. 8
FIG. 9
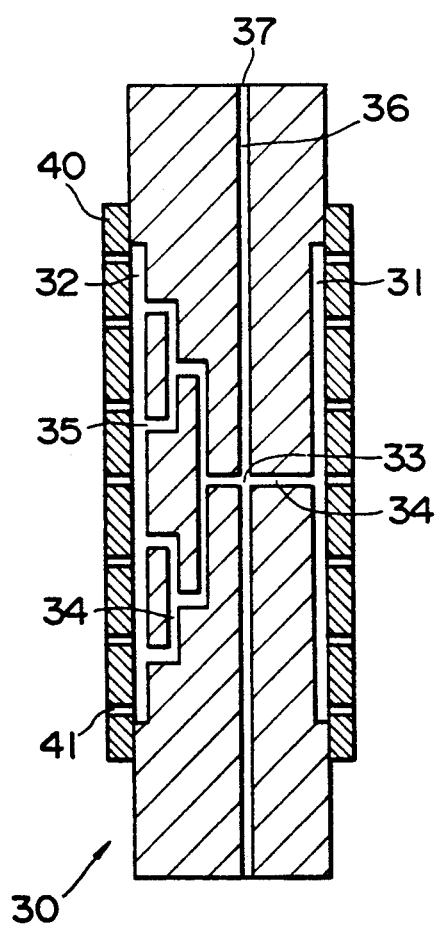
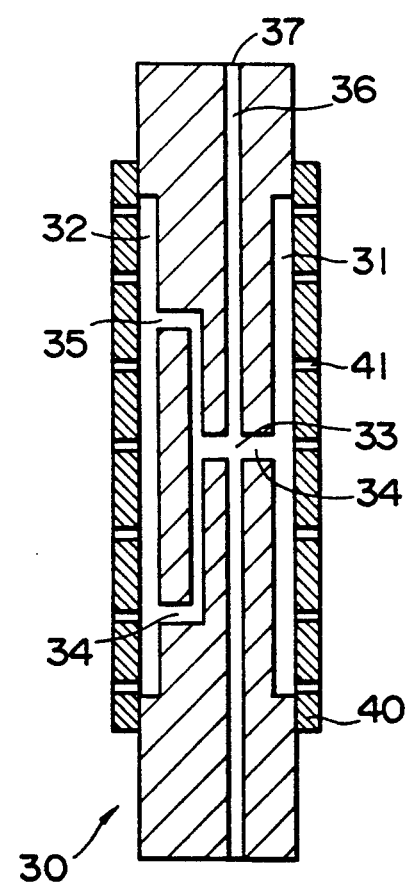

SEPARATOR

BACKGROUND OF THE INVENTION

This invention relates to a multiple-stage adsorption separator and, particularly, to a multiple-stage adsorption separator suitable for use as a multiple-stage adsorption separator with simulated moving-beds.

For the separation of a mixture which is difficult-to-separate in distillation process, a multiple-stage adsorption separating process of a simulated moving-bed system is known. In this separating process, four operations; a desorption operation, a concentration operation, an adsorption operation and a recovery operation of an adsorbent are performed continuously and simultaneously. Such adsorption separating technique with the simulated moving-beds is applied to, for example, the separation of a mixture of xylene isomer (Japanese Published Patent Application (Kokoku) No. 42-15681, Japanese Published Patent Application (Kokoku) No. 50-10517), the separation of diisopropyl naphthalene (Japanese Published Unexamined Patent Application (Kokai) No. 2-172929) and the like. FIG. 1 shows a diagram explaining the principle of adsorption separating with the simulated moving-bed system. In this Figure, the reference numerals 1-16 designate adsorption chambers having adsorbent packed beds and these chambers are connected mutually. The reference numeral 17 designates an adsorbent feed line, the reference numeral 18 designates an extract withdrawing line, the reference numeral 19 designates a feedstock feed line, the reference numeral 20 designates a raffinate withdrawing line and the reference numeral 21 designates a recycle line. The reference numeral 22 designates a pump. In the arrangement of the adsorption chambers 1-16 and the lines 17-21 as shown in FIG. 1, the desorption operation is performed in the adsorption chambers 1-3, the concentration operation is performed in the adsorption chambers 4-8, the adsorption operation is performed in the adsorption chambers 9-13 and the recovery operation of the adsorbent is performed in the adsorption chambers 14-16.

In such multiple-stage adsorptive separation with the simulated moving-bed system, each of the feed and withdrawing lines is shifted in the liquid flow direction by one chamber with valve control at a determined time interval. Therefore, in the next arrangement condition of the adsorption chambers, the desorption operation is performed in the adsorption chambers 2-4, the concentration operation is performed in the adsorption chambers 5-9, the adsorption operation is performed in the adsorption chambers 10-14 and the recovery operation of the adsorbent is performed in the adsorption chambers 15-1. Such an operation is continuously performed so that the adsorption separating process with the simulated moving-bed system for a fluid mixture can be attained.

An apparatus used for the above multiple-stage adsorption separating process of the simulated moving-bed system comprises the connected adsorbent packed beds. In order to carry out this adsorptive separation efficiently and economically, the development of the apparatus is an important, technical subject. The apparatus of this kind generally comprises the multiple adsorbent packed vessels connected sequentially through manifolds. However, in the case of this apparatus, since the multiple adsorbent packed vessels formed individually are used, equipment efficiency is low and equipment cost is increased, further pressure drop and heat loss of the fluid passed in the manifolds are increased, thus, the apparatus can not be admitted to be industrially advantageous.

According to Japanese Published Unexamined Patent Application (Kokai) No. 58-79534, an adsorbent separator is shown, which comprises a multiplicity of adsorbent packed beds arranged so as to define multiple-stages in a large, cylindrical vessel. However, in the case of this apparatus, due to the complicated arrangement of the adsorbent packed beds, it is difficult to arrange the adsorbent packed beds and their arranging operation requires long time, further, it is troublesome to change the adsorbents. Finally, this separator has a disadvantageous point of high equipment cost.

SUMMARY OF THE INVENTION

It is an object of the present invention to provide a multiple-stage adsorption separator which can overcome the above disadvantages involved in the prior art, whose structure can be simplified, whose equipment efficiency can be advanced, whose equipment cost can be lowered, which permits easy charging and discharging of the adsorbent and which can perform adsorptive separation efficiently and economically.

It is another object of the present invention to provide a partition plate suitable for use in a multiple-stage adsorption separator.

According to the present invention, there is provided a separator comprising:

an elongated, integrally formed cylindrical body disposed in a horizontal position;

a plurality of partition plates provided within the cylindrical body to define a multiplicity of contiguous chambers each of which is to be packed with an adsorbent;

an opening formed at the upper wall of each of the chambers and tightly closed with a detachable plug cover;

openings formed on both sides of each of the partition plates;

a first fluid passage provided in each of the partition plates for communicating the openings with each other; and a second fluid passage provided in each of the partition plates, and in fluid communication with the first fluid passage, the second fluid passage radially extending and opening at the periphery wall of the cylindrical body.

Further, according to the present invention, there is provided a separator having a structure in which a plurality of cylindrical body units each of which is open-ended at both ends and is to be packed with an adsorbent are connected to each other through partition plates, each of the cylindrical body units having an opening formed at the upper wall thereof and tightly closed with a detachable plug cover, each of the partition plates having openings formed on both sides and the periphery wall thereof, a first fluid passage communicating the openings formed on both sides thereof each other and a second fluid passage which is in fluid communication with the first fluid passage and with the opening formed on the periphery wall thereof.

Further, according to the present invention, there is provided a partition plate for a multiple-stage adsorption separator comprising openings formed on both sides and the periphery wall thereof, a first fluid passage for communicating the openings formed on both sides thereof with each other, and a second fluid passage in fluid communication with the first fluid passage and with the opening formed on the periphery wall thereof.

BRIEF DESCRIPTION OF THE DRAWINGS

Other objects, features and advantages of the invention will become apparent from the detailed description of the preferred embodiments of the invention which follows, when considered in light of the accompanying drawings, in which:

FIG. 4 is a cross-sectional view taken on the line IV—IV in FIG. 3;

FIG. 5 is a cross-sectional view taken on the line V—V in FIG. 3;

FIG. 6 is a cross-sectional view of a modification of a partition plate;

FIG. 7 is a cross-sectional view of another modification of a partition plate;

FIG. 8 is a cross-sectional view of still another modification of a partition plate;

FIG. 9 is a cross-sectional view of still another modification of a partition plate;

DETAILED DESCRIPTION OF PREFERRED EMBODIMENT

Figure 2:
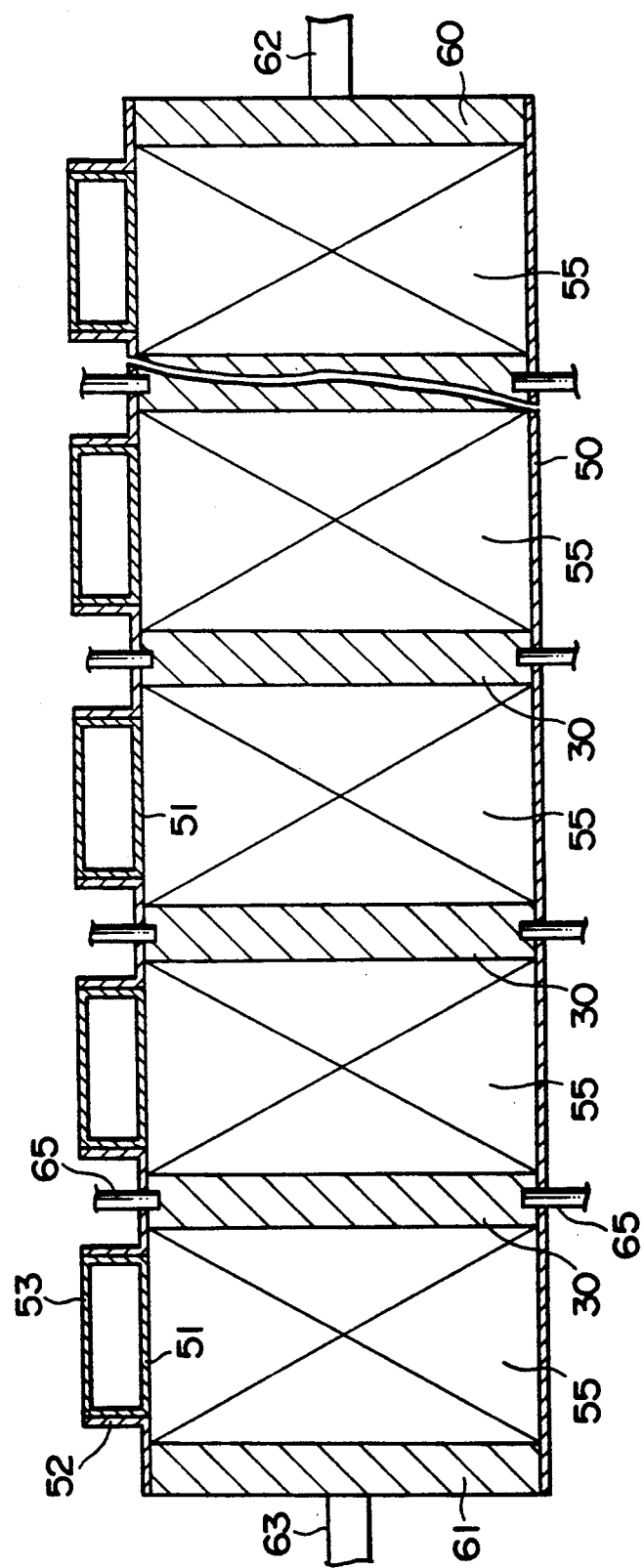
FIG. 2 is a diagram of the apparatus of the present invention using an integrally formed, elongated cylindrical body.

In FIG. 2, reference numeral 50 designates an elongated, integrally formed cylindrical body 50 which is disposed in a horizontal position. The internal space of the cylindrical body 50 is divided with a plurality of partition plates 30 to define a plurality of contiguous chambers 55. Each chamber 55 is packed with an adsorbent. Each chamber 55 packed with the adsorbent forms a unit of the adsorbent packed bed. An opening is provided on the upper wall of each chamber 55. This opening is closed tightly with a plug cover 51 provided detachably. Further, the opening is provided with a cylindrical member 52 stood from the rim of the opening and the top of the cylindrical member is closed tightly with a plate body 53. Since the plate body 53 is connected to the plug cover 51, by bringing the plate body 53 upward so as to remove from the cylindrical member 52, the plug cover 51 can be removed from the opening of the cylindrical body.

Each partition plate 30 is provided with the first flow passage passing a fluid on the direction of the axis of the cylindrical body and the second flow passage in fluid communication with the first flow passage and extending on the direction of the radius of the cylindrical body. This second flow passage is connected to pipes 65 provided through the periphery wall of the cylinder 50 so as to be utilized for discharging the fluid passed through the first flow passage to the outside of the cylinder or for introducing the fluid from the outside of the cylinder into the first flow passage provided on the direction of the axis of the cylindrical body.

End plates 60, 61 are provided at the both ends of the elongated cylindrical body 50, respectively. Pipes 62, 63 communicated with the internal space of the cylindrical body are provided at these end plates 60, 61, respectively.

Figure 3:
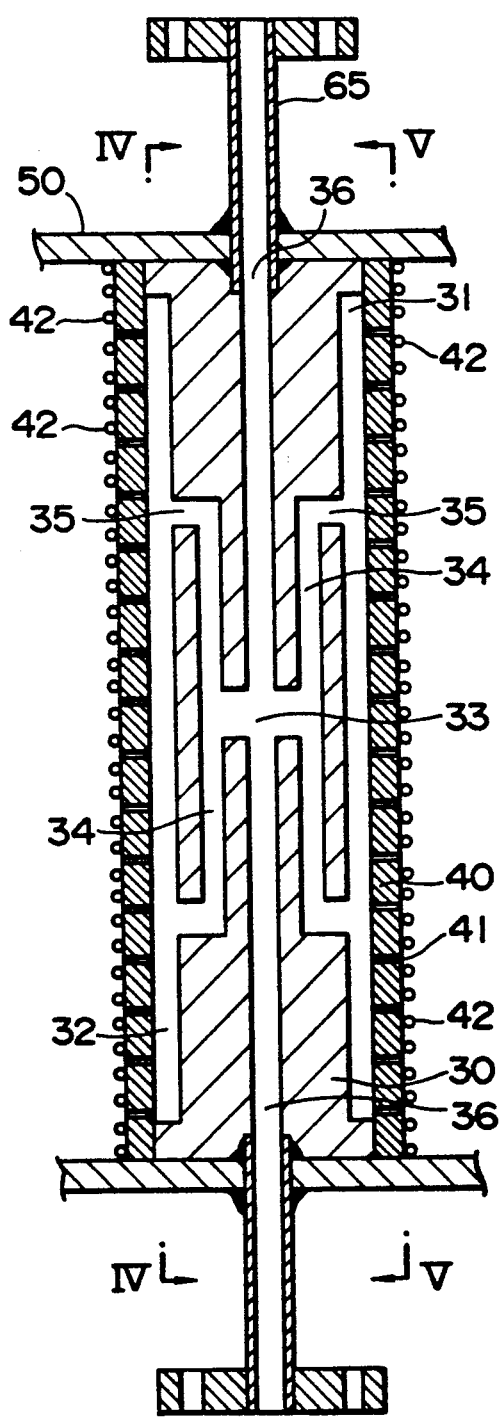
FIG. 3 is a cross-sectional view of a portion of the apparatus including a partition plate.

As shown in FIG. 3, the partition plate 30 is provided with a first concaved portion 31 formed on its one side, the second concaved portion 32 formed on its another side and a hollow portion 33 formed at its center portion. The hollow portion 33 is communicated with a plurality of openings 35 formed on the surface of the first concaved portion 31 through a fluid passage 34, on the other hand, the hollow portion 33 is communicated with openings 35 formed on the surface of the second concaved portion 32 through the fluid passage 34. The fluid passage 34 including the hollow portion 33 defines the first fluid passage passing the fluid on the direction of the axis of the cylindrical body.

As shown in FIG. 4, four openings 35 are provided at the first concaved portion 31 and the second concaved portion 32, respectively. On each surface of the first concaved portion 31 and the second concaved portion 32, four openings 35 must not always be provided, two- three or five or more than five openings 35 may be provided. The openings 35 are preferably angularly equally spaced from each other on the partition plate 30. It is also preferred that the number of the opening 35 be more than one per 0.05 $m^2$ of the cross sectional area of the cylindrical body 50 (of the area of the partition plate 30).

The hollow portion 33 is communicated with openings 37 formed at the periphery wall of the plate (as shown in FIG. 4) through a fluid passage 36. This fluid passage 36 extends on the direction of the radius of the cylinder and defines the second fluid passage introducing the fluid from the outside into the hollow portion 33 defining a portion of the first flow passage and discharging the fluid passed in the hollow portion 33 to the outside. Single opening 37 is enough but in the adsorption separator with the simulated moving-bed system, as shown in FIG. 4, four openings 37 are preferably provided. Precisely, in the multiple-stage adsorption separator with the simulated moving-bed system, it is known from FIG. 1 that the adsorbent feed line 17, the extract withdrawing line 18, the feedstock feed line 19 and the raffinate withdrawing line 20 are provided, thereby four openings 37 are preferably provided in advance on the periphery wall of the plate so as to be communicated with these lines, respectively.

Each opening 37 formed at the periphery wall of the partition plate 30 is connected to each pipe 65 provided through the periphery wall of the cylindrical body 50. The pipes 65 are secured to the periphery wall of the cylindrical body 50 by means of welding. The periphery wall of the partition plate 30 is secured to the cylindrical body 50 without a gap so as to prevent the fluid communication between the periphery wall of the partition plate and the inner surface of the cylindrical body 50. In this case, a sealing material may be provided between the periphery wall and the inner surface of the cylindrical body. Alternatively, the periphery wall of the partition plate 30 is secured to the inner surface of the cylindrical body 50 by means of welding.

At each surface of the first concaved portion 31 and the second concaved portion 32 of the partition plate 30, a perforated plate 40 provided with a large number of through-holes 41 is laminated. FIG. 5 shows an illustration of the perforated plate. It is preferable that the number of the through-holes 41 is as large as possible. The through-holes 41 are preferably arranged on the perforated plate such that each triangle defined with adjacent three through-holes 41 is an equilateral triangle. Each through-hole 41 has a diameter of 1-10 mm, preferably 2-5 mm and a pitch of 10-50 mm, preferably 20-30 mm. The number (n) of the through-hole is preferably determined by the following equation.

$$n = 1 + 6 \sum_{i=1}^{N} i$$

where D is the inner diameter of the cylindrical body 50, P is the pitch of the through-hole 41 and N=D/2P.

A screen member 42 is laminated on the surface of the perforated plate 40. The screen member is provided so as to prevent the through-holes 41 of the perforated plate being plugged with the adsorbent particles. A wire net or a porous plate is utilized for the screen member. The screen member 42 and the perforated plate 40, in laminated condition, are fixed to the partition plate 30 at their rim by bolts and the like.

The partition plate 30 may be a single plate body or a laminate formed of a plurality of piece blocks. The partition plate and the perforated plate are normally fabricated from metal. However, in some cases, the partition plate may be a ceramic plate or a resin plate.

The structure of the partition plate 30 may be modified variously and the examples are shown in FIGS. 6-9. In these Figures, the same reference numerals designate like parts throughout. As shown in FIGS. 3 and 6, the partition plate 30 preferably has a symmetrical structure with respect to the fluid passage 36 communicating the openings 37 formed at the periphery wall of the plate and the hollow portion 33. However, as shown in FIGS. 7-9, the partition plate 30 may have an unsymmetrical structure.

In each of the partition plates 30 shown in FIGS. 7-9, the fluid is preferably passed from the right side (the first concaved portion surface-side) to the left side (the second concaved portion surface-side).

The concaved portions 31, 32 are not always provided on the partition plate 30 and may be formed on the partition plate 30-side surface of the perforated plate 40. Further, the screen member 42 is laminated directly on the surface of the partition plate 30 without the perforated plate 40. Alternatively, a wire net or a fabric layer (glass fiber fabric, carbon fiber fabric and the like) may be provided between the partition plate 30 and the perforated plate 40. In these cases, the provision of the concaved portions 31, 32 can be omitted.

Figure 10:
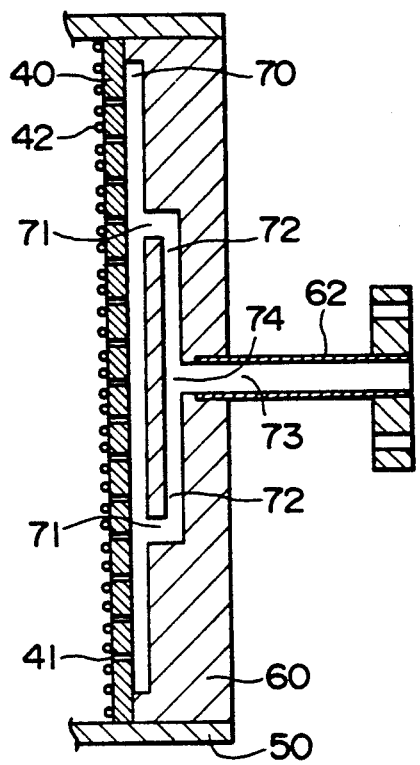
FIG. 10 is a cross-sectional view of an end plate provided on one end of the apparatus of the present invention.

FIG. 10 shows a cross sectional view explaining the end plate 60 closing tightly the right side open-end of the cylindrical body 50. The end plate 60 is provided with a fluid passage passing the fluid on the direction of the axis of the cylindrical body in its plate body.

Precisely, on the inner surface of the end plate 60, like the above partition plate 30, a concaved portion 70 is provided and a plurality of openings 71 are formed on the concaved portion 70. Then, the openings 71 are communicated with an opening 74 formed on the external surface of the end plate 60 through fluid passages 72, 73. The pipe 62 is connected to the opening 74.

On the surface of the concaved portion 70 of the end plate 60, like the above partition plate 30, the perforated plate 40 provided with through-holes 41 and the screen member 42 are laminated according to this order so that they are fixed to the rim of the end plate 60.

Figure 11:
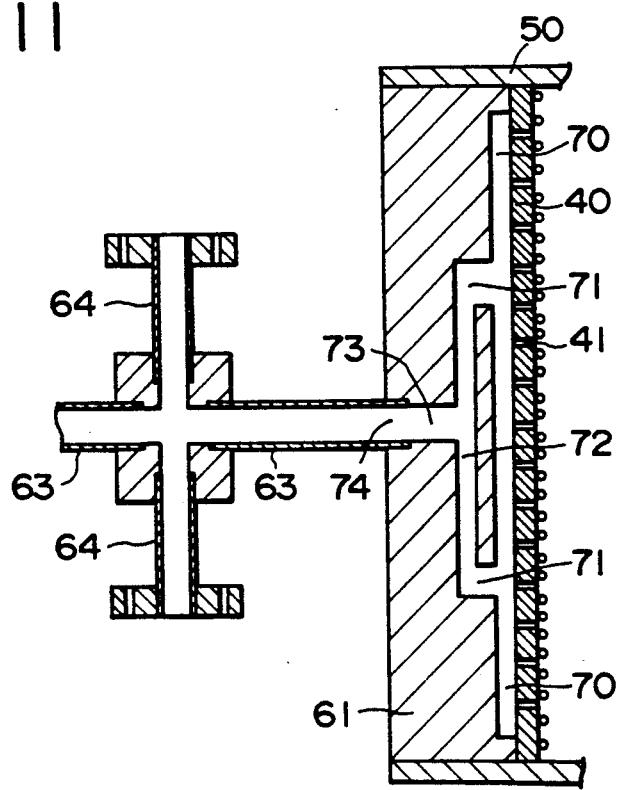
FIG. 11 is a cross-sectional view of an end plate provided on another end of the apparatus of the present invention.

FIG. 11 shows a cross sectional view explaining the end plate 61 closing the left side open-end of the cylindrical body 50. The end plate 61 is provided with a fluid passage passing the fluid on the direction of the axis of the cylindrical body in its plate body.

Precisely, on the inner surface of the end plate 61, like the above partition plate 30, a concaved portion 70 is provided and a plurality of openings 71 are formed on the concaved portion 70. Then, the openings 71 are communicated with an opening 74 formed on the external surface of the end plate 61 through fluid passages 72, 73. The pipe 63 is connected to the opening 74.

On the surface of the concaved portion 70 of the end plate 61, like the above partition plate 30, the perforated plate 40 provided with through-holes 41 and the screen member 42 are laminated according to this order so that they are fixed to the rim of the end plate 61.

A plurality of (four) branch pipes 64 are connected to the pipe 63. These branch pipes 64 are provided for discharging the fluid passed in the pipe 63 to the outside or, conversely, for introducing the fluid from the outside into the pipe 63.

The structure of the above end plates 60, 61 can be modified variously in the same way as the above partition plate 30. A structure in which the branch pipes 64 are contained in the end plate 61 may be adopted.

Figure 12:
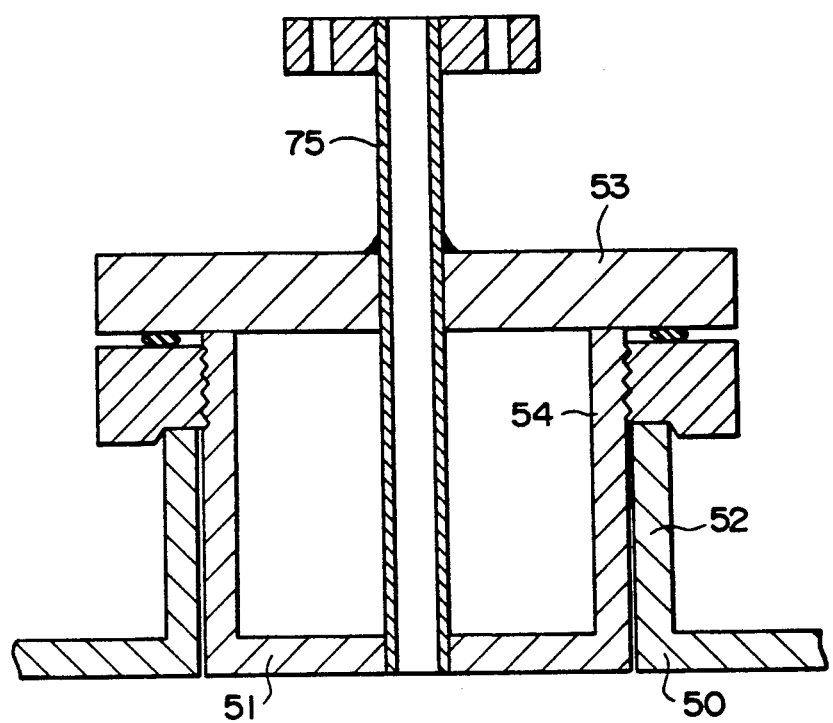
FIG. 12 is a view of a plug cover for an opening formed on the upper wall of a cylindrical body.

FIG. 12 shows a preferable embodiment of the plug cover 51 provided at the opening formed on the upper wall of the cylindrical body portion surrounding the units of the adsorbent packed bed.

In this Figure, the reference numeral 52 designates the cylindrical member standing from the rim of the opening formed on the upper wall of the cylindrical body portion. The bottom end of the cylindrical member is secured to the external surface of the cylindrical body 50 by means of welding. In the cylindrical member 52, the plug cover 51 closing tightly the opening of the cylindrical body 50 is provided detachably. Precisely, the plug cover 51 is formed so as to define the bottom of an inner cylinder 54 provided with a plate body 53 at its upper end. Then, the plug cover 51 and the plate body 53 are connected to a lead pipe 75 for pressure gauge. The upper surface of the cylindrical member 52 is fixed to the under surface of the plate body 53 without a gap so as to prevent the fluid in the cylindrical body 50 from discharging to the outside.

The opening formed on the upper wall of the cylindrical body is provided in order to charge and discharge the adsorbents easily and to inspect for the condition in the cylindrical body, especially for the condition of the screen member, the perforated plate and the partition plate. In an industrial scale plant, since an operator can go in and out through the opening, the operator can enter directly into the cylindrical body for check, repair and exchange the screen member, the perforated plate and the partition plate. Additionally, since the opening is provided in the cylindrical body and the opening is closed tightly by the detachable plug cover, the whole space in the cylindrical body can be packed with the adsorbent. Accordingly, the adsorbent packed bed having high efficiency of adsorptive separation per unit volume can be obtained.

Figure 13:
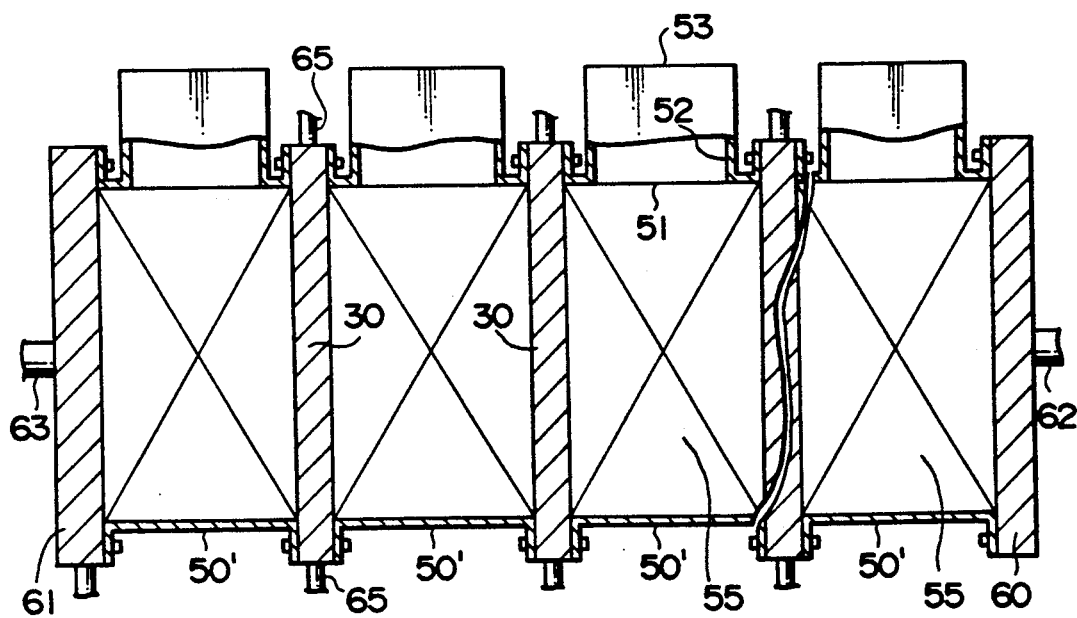
FIG. 13 is a diagram of the apparatus of the present invention using short cylindrical bodies open-ended at both ends.

In the multiple-stage adsorption separator of the present invention, its structure can be optionally modified. For example, in the apparatus shown in FIG. 2, the integrally formed, elongated cylindrical body 50 is used and the partition plates 30 are provided in the cylindrical body. However, such structure is not critical. The apparatus of the present invention can be also obtained by connecting sequentially a plurality of short cylindrical body units open-ended at both ends through partition plates. A general view explaining the apparatus of this case is shown in FIG. 13. The same reference numerals of FIG. 13 as those of FIG. 2 have the same meaning. In this Figure, reference numeral 50' is the cylindrical body unit open-ended at both ends. The adsorbent packed bed, which is charged in an adsorbent packed vessel 55 comprising the cylindrical body unit 50' and the partition plate 30, forms a unit of the adsorbent packed bed.

The structure of the openings and the fluid passages in the partition plate 30 of FIG. 13 is the same as the structure of FIG. 3. However, in this embodiment, the diameter of the partition plate 30 is larger than the external diameter of the cylindrical body unit 50' such that the cylindrical body units 50' can be connected.

In FIGS. 2 and 13, the left side end plate 61 may be formed in the same way as the partition plate 30. In this case, the fluid passed in the direction of the axis of the cylindrical body is withdrawn to the outside through the pipe 65 (see FIG. 3), which is connected to the openings 37 formed on the periphery wall of the partition plate 30, while the fluid from the outside can be combined, through the pipe 65, with the fluid passed in the direction of the axis of the cylindrical body, thus, the pipe 64 shown in FIG. 11 can be omitted.

Further, two apparatuses of the present invention may be connected in series through pipe lines in order to increase the step number of the adsorbent packed vessel.

In the apparatus of the present invention, in order to attain uniform dispersion of the fluid passed in the adsorbent packed bed, the cylindrical body portion surrounding the units of the adsorbent packed bed has the length L of not less than 20 cm, preferably not less than 40 cm. However, if L is too long, the fluid passed in the adsorbent packed bed can not be dispersed smoothly and creates large pressure drop. Thus, L is not greater than 2 m, preferably not greater than 1 m. The internal diameter D of the cylindrical body may be optionally increased according to the process capacity of the apparatus. On the other hand, D has an inferior limit, because if D is too small, the fluid passed in the packed bed can not be dispersed smoothly and creates large pressure drop.

As a result, in the present invention, the internal diameter D of the cylindrical body is determined so as to provide a ratio L/D of not greater than 2, preferably not greater than 1. By defining the value L/D in this range, the fluid passed in the adsorbent packed bed can keep a flow pattern of plug flow, the fluid can be dispersed uniformly and efficient contact of the fluid with the adsorbent can be maintained.

FIG. 13 shows the example of the separator disposed in the horizontal position but the axis of the cylindrical body unit can be disposed in a vertical position and the partition plate 30 can be disposed in the horizontal position.

In the apparatus of the present invention, the number of the packed bed vessel defined with the partition plate 30 and the cylindrical body 50 or 50' is generally 10–30 or more than it. The number is optionally determined according to the purity of a feedstock to be adsorption separated and that of a separated component.

As the adsorbent, conventional substances such as silica gel, zeolite and the like are used. As the zeolite, X-type zeolite and Y-type zeolite are preferably used. The zeolite can include metal cation such as sodium, lithium, beryllium, potassium, magnesium, calcium, barium, strontium, lantern and the like as cation-core, further, can include lead, zirconium, yttrium and the like. The adsorbent can be selected optionally according to the kind of the feedstock to be adsorption processed and the desired component.

Figure 1:
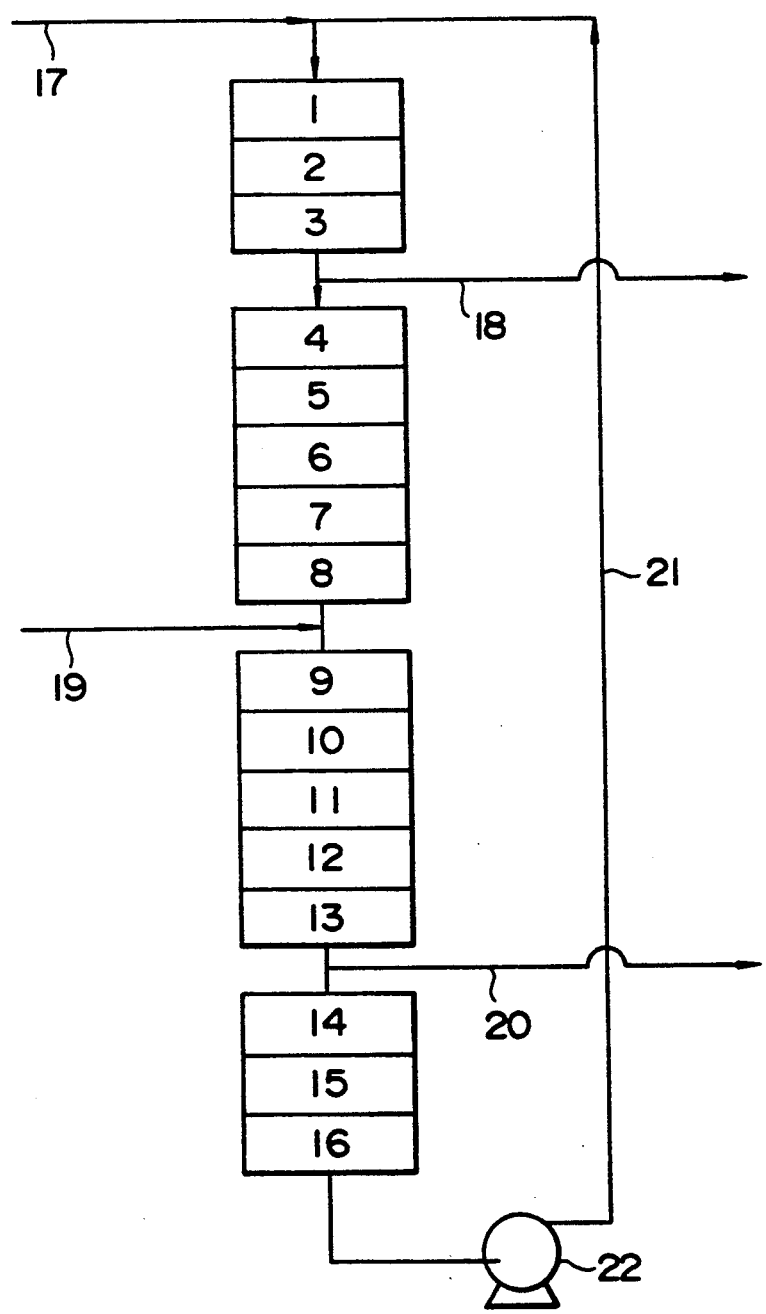
FIG. 1 is a diagram explaining the principle of a multiple-stage adsorption separating process with simulated moving-beds.

In the multiple-stage adsorption separator of the present invention, to the four pipes 65 connected to the openings 37 formed on the periphery wall of each partition plate 30 and the four branch pipes 64 connected to the pipe 63 of the left side end plate of the apparatus (see FIG. 11), the adsorbent feed line 17, the extract withdrawing line 18, the feedstock feed line 19 and the raffinate withdrawing line 20 shown in FIG. 1 are connected respectively, then, the pipes 62, 63 provided at the both sides of the apparatus are connected to the recycle line 21 including the recycle pump, thus, the apparatus of the present invention can be used as the multiple-stage adsorption separator with the simulated moving-bed. In FIG. 2, the fluid is passed from the right side to the left side, and the fluid discharged from the left side pipe 63 is recycled through the recycle line 21 to the right side pipe 62.

In the multiple-stage separator operated in the simulated moving-bed system, the valve control is performed at the determined time interval such that each of the feed and withdrawing lines is shifted in the fluid flow direction by one adsorbent packed vessel 55. By carrying out such valve control, the specified component can be withdrawn through the extract withdrawing line 18 (see FIG. 1) from the feedstock mixture.

The apparatus of the present invention comprises the units of the adsorbent packed bed piled up through the partition plates so as to define multiple-stages. Accordingly, the structure of the whole separator is very simple, further, packing rate of the adsorbent and equipment efficiency are advanced, the whole process is simplified and equipment cost is decreased extremely.

In the horizontal type apparatus of the present invention, particularly, the opening is provided at the upper wall of the cylindrical body surrounding the unit of the adsorbent packed bed, thus, charging, withdrawing and exchange of the adsorbent can be performed in each packed vessel with good activity. In the apparatus of the present invention, since the adsorbent can be charged rapidly, the problem as for the moisture contamination which would be caused in the adsorbent charging operation can be prevented resulting in a great advantageous point. Further, in the apparatus of the present invention, the number of the packed vessel can be increased and decreased easily according to the requirement.

Further, since the apparatus of the present invention comprises the units of the adsorbent packed bed piled up through the partition plates, the distance formed between the adjacent units of the adsorbent packed bed is extremely short, thereby pressure drop of the fluid passed through each unit of the adsorbent packed bed is reduced. Thus, pressure proof of apparatus design is lightened and required power is decreased, further, heat loss from the apparatus and pipe lines can be prevented, which causes great advantage in heat economy.

The apparatus of the present invention can be applied advantageously in separating a specific component from the mixture of a plurality of components being difficult-to-separate with the distillation process such as the mixture of xylene isomers, the mixture of xylene and ethylbenzene, the mixture of one selected from saturated fatty acid and its ester and one selected from unsaturated fatty acid and its ester, the mixture of paraffin and olefin, the mixture of isoparaffin and normal paraffin and the like. This apparatus can be operated in liquid phase condition or gas phase condition, but normally in liquid phase condition.

Next, the present invention will be explained more closely on the basis of an example.

EXAMPLE

On each side of a metal partition plate having a structure shown in FIG. 3 and the thick of 80 mm (the fluid passages formed in the partition plate have the same diameter of 16 mm), a metal perforated plate provided with through-holes each of which has the diameter of 2 mm and the pitch of 20 mm and a 60 mesh-wire net fabricated from rustles wire are laminated and secured one by one. Then, on one side of the dispersed liquid, a metal plate provided with a pipe therethrough at its center is laminated and secured so as to form a plate body.

These plate bodies are fixed to the both end openings of a cylindrical body, which has the length of 50 cm and the inner diameter of 100 cm and is provided with an opening at its upper wall, so as to close the openings. While the load of 50 kg is applied, silica particles having the characteristic mean particle size of 0.8 mm are charged from the opening at the upper wall. Then, the opening at its upper wall is closed so as to form a horizontal type cylindrical adsorbent packed bed.

Next, water is introduced at the feed rate of 6 m$^3$/hr on the normal temperature through the pipe provided at the external metal plate of the plate body fixed to one end of this horizontal type cylindrical adsorbent packed vessel (the openings formed on the periphery wall of the partition plate forming this plate body are closed), and the water is discharged through the pipe provided at the external metal plate of the other plate body (the openings formed on the periphery wall of the partition plate forming this plate body are closed). Then, 2% aq. of sodium chloride is injected as a pulse tracer into the water passed through the pipe for supply water at a determined time interval. By observation for the electric conductivity trend of the discharged liquid, a pulse response curve can be measured. As a result, the normalization concentration reaches 10 for the normalized quantity of effluent 1 (number of perfect mixing vessel is 130), which ensures uniform liquid dispersion. On the other hand, pressure drop is 0.18 kg/cm$^2$ across the adsorbent packed vessel.

COMPARATIVE EXAMPLE

A pulse response curve produced in the case that the partition plates included in the plate body in Example 1 are removed from the plate body is extremely gentle (the normalization concentration is not greater than 1 for the normalized quantity of effluent 1), which means that uniform liquid dispersion can not be obtained at all.

What is claimed is:

1. A separator comprising:
   an elongated, integrally formed cylindrical body disposed in a horizontal position;
   a plurality of partition plates provided within said cylindrical body to define a multiplicity of contiguous chambers each of which is packed with an adsorbent;
   an opening formed at the upper wall of each of said chambers and tightly closed with a detachable plug cover;
   openings formed on both sides of each of said partition plates;
   a first fluid passage provided in each of said partition plates for communicating said openings with each other; and
   a second fluid passage provided in each of said partition plates and in fluid communication with said first fluid passage, said second fluid passage radially extending and opening at the periphery wall of said cylindrical body.

2. A separator according to claim 1, further comprising a screen member laminated through a perforated plate on each side of each of said partition plates.

3. A separator according to claim 2, wherein the both sides of each of said partition plates have concaved portions.

4. A separator according to claim 3, wherein said screen member is a wire net.

5. A separator according to claim 1, wherein each of said adsorbent packed chambers has such a length L and a diameter D as to provide a ratio L/D of not greater than 2.

6. A separator having a structure in which a plurality of cylindrical body units each of which is open-ended at both ends and is packed with an adsorbent and are connected to each other through partition plates, each of said cylindrical body units having an opening formed at the upper wall thereof and tightly closed with a detachable plug cover, each of said partition plates having openings formed on both sides and on the periphery wall thereof, a first fluid passage provided in each of said partition plates communicating said openings formed on both sides thereof each other and a second fluid passage provided in each of said partition plates which is in fluid communication with said first fluid passage and with said opening formed on the periphery wall thereof.

7. A separator according to claim 6, further comprising a screen member laminated through a perforated plate on each side of each of said partition plates.

8. A separator according to claim 7, wherein the both sides of each of said partition plates have concaved portions.

9. A separator according to claim 8, wherein said screen member is a wire net.

10. A separator according to claim 6, wherein each said cylindrical unit has such a length L and a diameter D as to provide a ratio L/D of not greater than 2.

* * * * *